March 24, 1970     W. F. MULLER     3,502,097
CATHETER-INFUSER CONNECTOR
Filed June 8, 1966     2 Sheets-Sheet 2
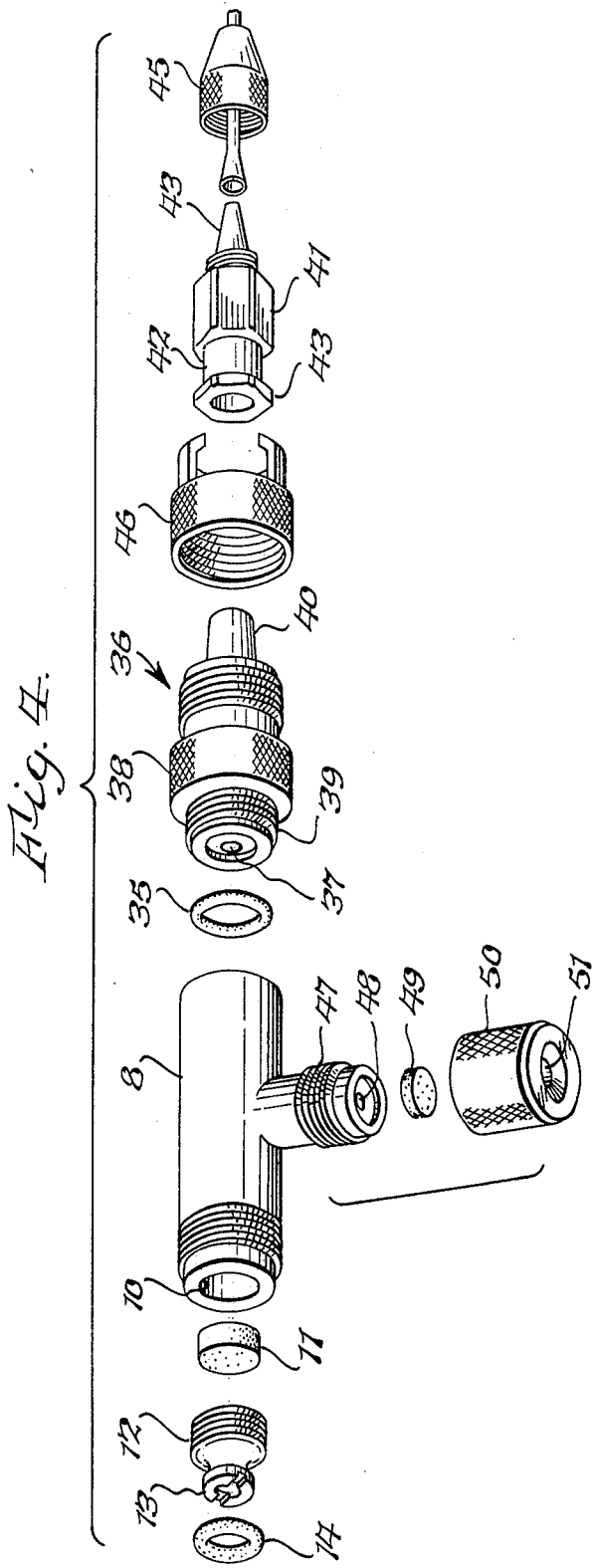
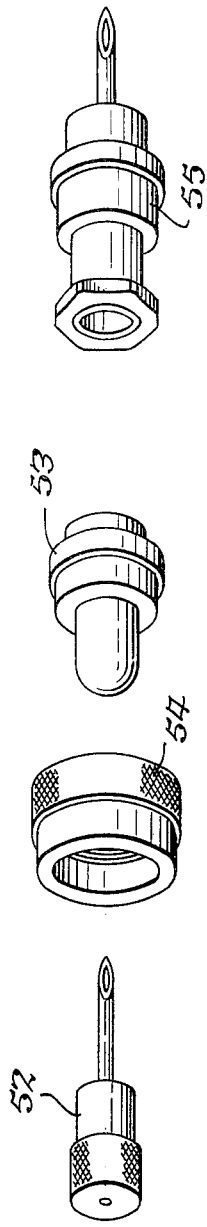
INVENTOR.
Wolf F. Muller
BY
Dayton R. Stemple, Jr.
ATTORNEYS.

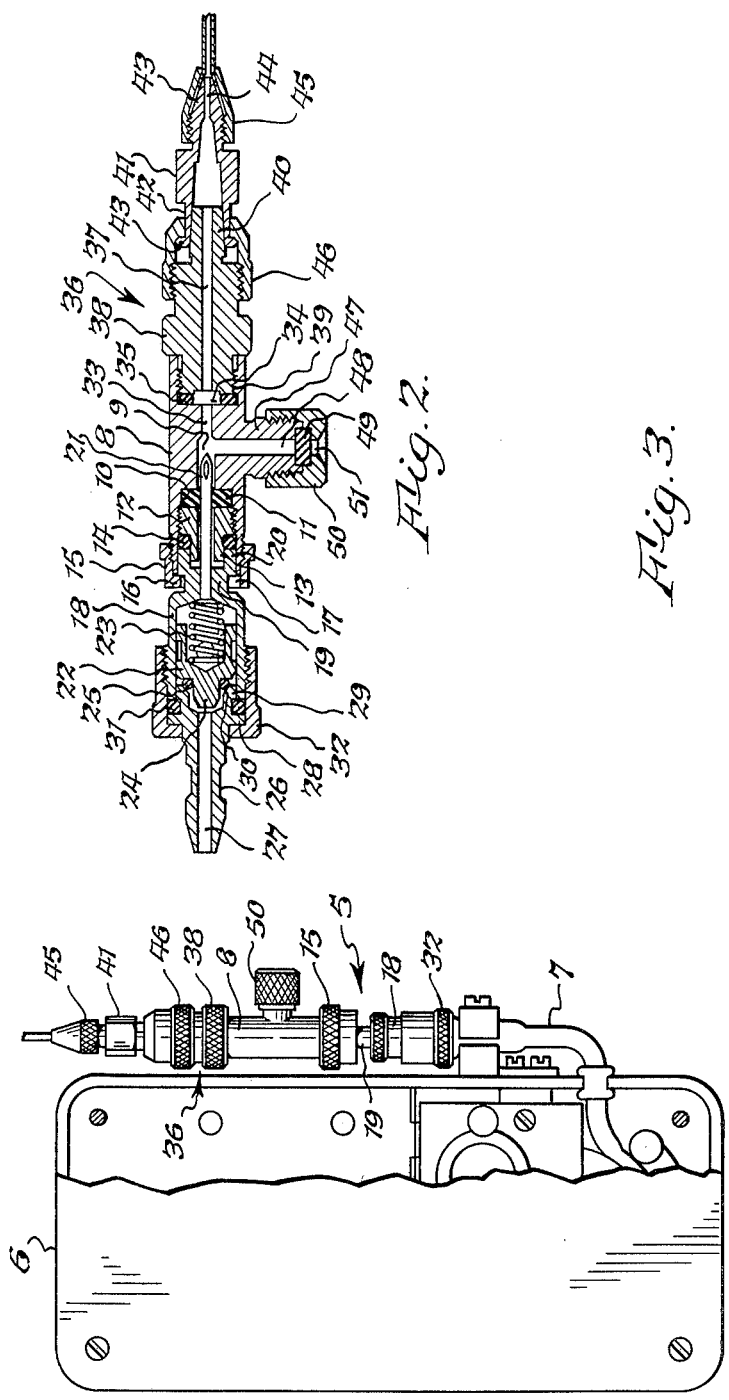

3,502,097
Patented Mar. 24, 1970

3,502,097
CATHETER-INFUSER CONNECTOR
Wolf F. Muller, New York, N.Y., assignor to United States Catheter & Instrument Corporation, Glen Falls, N.Y., a corporation of Delaware
Filed June 8, 1966, Ser. No. 556,221
Int. Cl. A61m 5/14, 25/00; F16k 15/06
U.S. Cl. 137—318                                                                 2 Claims

ABSTRACT OF THE DISCLOSURE

This invention is directed to a one way flow valve system to be positioned between a positive pressure infusion device and a catheter leading to a body passage or cavity, e.g. the circulatory system which has periodic pressure surges. The unit may be easily split to control flow of the infuser and/or catheter. The unit further provides an angular member to introduce supplemental liquid into the flow stream.

---

This invention relates to new and useful improvements in valves for connecting liquid infusers to catheters and particularly seeks to provide a novel multipurpose unit containing a monoflow valve, a catheter connecting section and a device for permitting the introduction of a supplementary liquid into the unit.

Chronometric and other types of infusion apparatus are currently used for such applications as the intra-arterial or intravenous infusion of various chemotherapeutic drugs in ambulatory patients.

It is desirable in such applications to be able readily to make and break operative connection to the infusion apparatus, prevent back-flow of blood and/or liquid from a connected catheter, make and break operative connection to the catheter, and to either flush the connecting unit or inject supplementary liquids therein for introduction into the throughput from the infuser to the catheter.

Therefore, an object of this invention is to provide a connecting unit that includes a readily detachable infuser-connecting section provided with a monoflow valve to prevent back-flow of liquid into the infuser and a readily detachable catheter-connecting section containing an element for permitting the injection of a supplementary liquid.

Another object of this invention is to provide a novel method for attaching a catheter to a connecting unit.

With these and other objects in view, the invention will be more fully understood by reference to the drawings, the accompanying detailed description and the appended claims.

In the drawings:

FIG. 1 is a fragmentary top plan view of one form of infusion apparatus to which a unit constructed in accordance with this invention is connected;

FIG. 2 is a horizontal longitudinal section of the connecting unit shown in FIG. 1;

FIG. 3 is an exploded isometric view of the elements of the infuser-connecting section of the unit;

FIG. 4 is an exploded isometric view of the elements of the catheter-connecting section of the unit; and FIGS. 5 through 8 are isometric views of accessory elements used under certain physical conditions when infusion has been discontinued.

Referring to the drawings in detail, the invention as illustrated is embodied in a connecting unit generally indicated 5 mounted on an infusion apparatus 6 and is operatively connected to a discharge tube 7 thereof.

Although connecting units constructed in accordance with this invention can be used with many different types of infusion apparatus, they are particularly useful with the self-contained portable type of infusion apparatus disclosed and claimed in my co-pending application for U.S. Letters Patent, Ser. No. 404,425, filed Oct. 16, 1964, now Patent 3,384,080, granted May 21, 1968.

All of the metal parts of this connecting unit preferably are fabricated from stainless steel and include a longitudinally extending body 8 provided with an axial duct 9 extending into open communication with an annular recess 10 which is internally threaded along a portion of its length. A disk 11, formed from self-sealing rubber is seated at the bottom of the recess 10 and seals the duct 9 when the infuser-connecting section is disconnected as will be hereinafter more fully described. The disk 11 is retained in position by a screw plug 12 having an axial duct of a diameter equal to that of the duct 9 and provided at its outer end with a portion of reduced diameter to define a shouldered stud 13 which carries a rubber O-ring gasket 14.

A knurled retaining cap 15, closed at one end by a web 16 provided with an eccentrically disposed orifice 17, is threadably engaged over the plug-containing end of the body 8 and serves to lock the infuser-connecting section in place.

The infuser-connecting section includes a cylindrical valve body 18 having an axially extending neck 19 terminating in an enlarged annulus 20 having an outside diameter substantially equal to the inside diameter of the body recess 10 in order to fit freely, but not loosely therein. The free end of the annulus 20 seats against the O-ring gasket 14 and is retained in that position by the knurled cap 15.

An axially aligned hypodermic needle 21 affixed to the valve body 18, has one end extending into open communication with the interior of the valve body and its other or pointed end extending through the screw plug 12 and self-sealing disk 11 into the duct 9.

A ported valve piston 22 is mounted for free axial movement within the valve body 18 and is constantly biased toward the open end thereof by a compression spring 23. That end of the piston 22 which is away from the biasing spring 23 is provided with an axial stud 24 of reduced diameter carrying a rubber O-ring gasket 25 that serves as a valve seal as will be hereinafter more fully described.

A cannula 26, having an axial duct 27 extending therethrough, is provided adjacent one end with a locking flange 28 having an outside diameter substantially equal to the outside diameter of the valve body 18. An end flange 29, having an outside diameter substantially equal to the inside diameter of the valve body 18 fits therein and is internally bevelled to define a valve seat 30 against which the piston O-ring gasket 25 is adapted to seat under the urging of the spring 23. A rubber O-ring gasket 31 is fitted between the locking flange 28 and the adjacent end of the valve body 18. The cannula 26 is retained in place by a knurled locking cap 32 threadably engaged over the outer end of the valve body.

The other end of the body 8 is part of the catheter-connecting section and is provided with an axial duct 33 extending into open communication with an annular recess 34 which is internally threaded along a portion of its length. A rubber O-ring gasket 35 is seated at the bottom of the recess 34 to serve as a liquid seal when the catheter-connecting section is assembled.

The catheter-connecting section includes a nipple generally indicated 36 having an axial duct 37 extending therethrough and provided intermediate its ends with an enlarged knurled turning bead 38. One end of the nipple is of reduced diameter and is externally threaded as at 39 for engagement with the internal threads of the recess 34 so that the end of the nipple is brought into sealing engagement with the O-ring gasket 35.

The other end of the nipple 36 is somewhat larger in diameter than the one engaged in the recess 34, is externally threaded and is provided at its outer end with an axial tapered stud 40 of reduced diameter.

A hollow catheter clamp core 41 is provided at one end with a sleeve 42 having an end flange 43. The inside diameter of the sleeve 42 is substantially equal to the mean diameter of the tapered stud 40 to assure a liquid-tight fit when the two are assembled together. The other end of the clamp core 41 is externally threaded and terminates in a cone 43 having a roughened surface at its tip and provided with an axial duct 44. A generally conical compression cap 45 is threadably engaged over the cone 43 to securely hold the flared end of a catheter therebetween.

A knurled retainer 46 is threadably engaged over the large end of the nipple 36 and securely holds the core sleeve 42 in place on the stud 40.

The unit body 8 is provided with an externally threaded radial extension 47 having a duct 48 extending into communication with the duct 9. The outer end of the extension 47 is countersunk to receive a disk 49 formed from self-sealing rubber and retained in position by a knurled cap 50 having a central orifice 51 aligned with the duct 47.

In use the end of a catheter is flared and clamped over the cone 43 by the compression cap 45 and the cannula 26 is inserted into the discharge tube of the associated infusion apparatus. Whenever the liquid pressure from the infusion apparatus is less than the back pressure from the liquid in the catheter, the piston valve 22 seats against the valve seat 30 of the cannula 26 to prevent liquid from being forced back into the infusion apparatus. Conversely, when the back pressure from the liquid in the catheter is less than the liquid pressure from the infusion apparatus, liquid will flow therefrom past the piston valve 22 through the remainder of the connecting unit and into the catheter.

This invention also provides a novel method for connecting the end of a surgically positioned catheter to an infusion apparatus.

When such a connection is to be made the infuser-connecting section of the unit is first disconnected by unscrewing the retaining cap 15 and removing the valve body 18 and its associated elements.

The free end of the surgically positioned catheter, which up to now has been fitted with a needle and three-way stopcock, is cut to the desired length and a snugly fitting wire stylette is quickly inserted therein.

Remove the clamp core 41 and compression cap 45 from the unit by unscrewing the retainer 46 and then remove the compression cap from the core.

Then insert the wire stylette and the end of the catheter through the pointed end of the compression cap 45 and continue by inserting the stylette into the conical end of the clamp core 41 so that the extreme end of the catheter is pressed into engagement over the conical tip 43 thereof. Then re-engage the compression cap 15 on the clamp core to securely retain the catheter end in clamped position therebetween.

The free end of the wire stylette is then passed through the retainer 46 preparatory to insertion through the self-sealing rubber disk 11. The clamp core 41 is again axial ducts 33 and 9 of the unit body 8 and through the positioned in the retainer 46 which is screwed back in place on the nipple 36.

The free end of the wire stylette now projects beyond the exposed face of the screw plug 12 and can be withdrawn from the catheter bringing the lumen of the catheter into open communication with the interior of the connecting unit.

At this point the infuser-connecting section, which has already been connected to the discharge tube of the associated infusion apparatus, is quickly refastened to the body 8 by the eccentric retainer 15.

When infusion is to be temporarily discontinued the infuser-connecting section is removed by disconnecting the eccentric retainer 15 and the needle 21 is replaced by a filament needle 52 of the type shown in FIG. 5 of the drawings. After the filament needle has been inserted through the screw plug 12 and the self-sealing disk 11, a nylon or other suitable filament is threaded therethrough and through the remainder of the unit into at least the lower end of the attached catheter. Then a filament cap 53 (see FIG. 7 of the drawings) is fitted over the base of the filament needle and retained thereby a concentric retainer 54 (see FIG. 6 of the drawings) which replaces the eccentric retainer 15 normally used to hold the infuser-connecting section in place.

If angiography is to be performed a female Luer needle 55 (see FIG. 8 of the drawings) is used instead of the filament needle and filament cap and is retained in position by the concentric retainer 54.

I claim:

1. In a multipurpose unit for connecting an infuser to a catheter; a main body having an axial duct extending therethrough and provided adjacent one end thereof with a flow preventing disk of self-sealing material; a hollow infuser-connecting section removably attached to that end of said main body that contains said disk and including a hollow needle projecting through said disk to establish liquid flow communication between said infuser-connecting section and the said axial duct of said main body, and a monoflow valve in said infuser-connecting section for permitting liquid only to flow from an attached infuser through said hollow needle into said axial duct; and a catheter connecting section removably attached to the other end of said main body and including a clamp core provided with a generally conical tip for receiving and flaring the end of a catheter to be attached, and a generally conical compression cap overlying said conical tip and adapted to securely hold a catheter end positioned therebetween.

2. The unit of claim 1 additionally including a radial extension formed integrally with said main body and having an axial duct extending into open communication with the duct of said main body, a disk of self-sealing material closing the end of said radial extension, and means for retaining said disk in its end-closing position with at least the center portion of its outer face exposed.

References Cited

UNITED STATES PATENTS

| 1,930,182 | 10/1933 | Richardson | 141—329 X |
| 2,957,501 | 10/1960 | Holmes | 141—329 X |
| 3,362,406 | 1/1968 | Logsdon | 141—329 X |
| 2,531,667 | 11/1950 | Brent | 128—214.4 |
| 2,710,004 | 6/1955 | Stamper | 128—214 |
| 2,828,744 | 4/1958 | Hirsch et al. | |
| 3,057,350 | 10/1962 | Cowley | 128—214 |
| 3,081,770 | 3/1963 | Hunter | 128—350 X |
| 3,097,646 | 7/1963 | Scislowicz | 128—214.4 |
| 3,157,201 | 11/1964 | Littmann | 128—214 X |
| 3,192,949 | 7/1965 | DeSee. | |
| 3,313,299 | 4/1967 | Spademan | 128—214.4 |

FOREIGN PATENTS

| 1,064,445 | 12/1953 | France. |
| 156,901 | 11/1956 | Sweden. |

WILLIAM F. O'DEA, Primary Examiner

DAVID J. ZOBKIW, Assistant Examiner

U.S. Cl. X.R.

128—214, 348; 137—612.1, 614.2